US 12,535,556 B2

(12) United States Patent
Han et al.

(10) Patent No.: US 12,535,556 B2
(45) Date of Patent: Jan. 27, 2026

(54) SENSOR CONTROL METHOD AND APPARATUS, AND SENSOR

(71) Applicant: SHENZHEN YINWANG INTELLIGENT TECHNOLOGIES CO., LTD., Shenzhen (CN)

(72) Inventors: Guanglin Han, Shenzhen (CN); Tao Ma, Beijing (CN)

(73) Assignee: SHENZHEN YINWANG INTELLIGENT TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/796,815

(22) Filed: Aug. 7, 2024

(65) Prior Publication Data

US 2024/0393424 A1 Nov. 28, 2024

Related U.S. Application Data

(63) Continuation of application No. 17/557,645, filed on Dec. 21, 2021, now Pat. No. 12,072,432, which is a continuation of application No. PCT/CN2020/097296, filed on Jun. 20, 2020.

(30) Foreign Application Priority Data

Jun. 21, 2019 (CN) .......................... 201910542746.8

(51) Int. Cl.
*G01S 7/00* (2006.01)
*G01S 13/931* (2020.01)

(52) U.S. Cl.
CPC ............ *G01S 7/003* (2013.01); *G01S 13/931* (2013.01)

(58) Field of Classification Search
None
See application file for complete search history.

(56) References Cited

U.S. PATENT DOCUMENTS

| | | |
|---|---|---|
| 9,796,390 B2 | 10/2017 | Halder et al. |
| 9,834,210 B2 | 12/2017 | Ohbayashi et al. |
| 9,990,783 B2 | 6/2018 | Leboeuf et al. |
| 10,155,541 B2 | 12/2018 | Noh |
| 10,167,015 B2 * | 1/2019 | Rust ...................... B60T 13/662 |
| 10,384,719 B2 | 8/2019 | Kim |
| 10,431,027 B2 | 10/2019 | Ishihara et al. |
| 10,513,244 B2 | 12/2019 | Murakami et al. |

(Continued)

FOREIGN PATENT DOCUMENTS

| | | |
|---|---|---|
| CN | 102893173 A | 1/2013 |
| CN | 103707826 A | 4/2014 |

(Continued)

*Primary Examiner* — K. Wong
(74) *Attorney, Agent, or Firm* — Conley Rose, P.C.

(57) ABSTRACT

A sensor control method includes: obtaining first indication information, where the first indication information indicates a first scenario; determining a configuration parameter of at least one sensor based on the first indication information, where the configuration parameter is corresponding to the first scenario; and sending the configuration parameter to the at least one sensor. The sensor control method may be applied to automatic driving or intelligent driving, and may be specifically applied to assisted driving or unmanned driving. The sensor can be flexibly controlled through configurable parameters of sensors such as radar or a camera.

20 Claims, 6 Drawing Sheets

(56) References Cited

U.S. PATENT DOCUMENTS

| | | |
|---|---|---|
| 10,569,739 B2 | 2/2020 | Pudar et al. |
| 10,606,257 B2 | 3/2020 | Kim et al. |
| 10,683,004 B2 | 6/2020 | Lavoie et al. |
| 10,919,574 B2 | 2/2021 | Kim et al. |
| 11,305,766 B2 | 4/2022 | Hanna |
| 11,332,131 B2 | 5/2022 | Park |
| 2008/0266169 A1 | 10/2008 | Akita |
| 2012/0293359 A1 | 11/2012 | Fukuda et al. |
| 2015/0153184 A1 | 6/2015 | Mudalige et al. |
| 2016/0114798 A1 | 4/2016 | Kim et al. |
| 2017/0285165 A1 | 10/2017 | Khlifi |
| 2019/0171937 A1 | 6/2019 | Lin et al. |
| 2019/0179026 A1 | 6/2019 | Englard et al. |
| 2019/0179317 A1 | 6/2019 | Englard et al. |
| 2020/0371820 A1 | 11/2020 | Chen et al. |
| 2023/0029093 A1 | 1/2023 | Pedersen et al. |

FOREIGN PATENT DOCUMENTS

| | | |
|---|---|---|
| CN | 104477168 A | 4/2015 |
| CN | 104691447 A | 6/2015 |
| CN | 105329237 A | 2/2016 |
| CN | 106716173 A | 5/2017 |
| CN | 107071147 A | 8/2017 |
| CN | 108375775 A | 8/2018 |
| CN | 108491275 A | 9/2018 |
| CN | 108569296 A | 9/2018 |
| CN | 109017802 A | 12/2018 |
| CN | 109017803 A | 12/2018 |
| CN | 109507670 A | 3/2019 |
| CN | 109532824 A | 3/2019 |
| CN | 109552289 A | 4/2019 |
| CN | 109774584 A | 5/2019 |
| JP | 2004224093 A | 8/2004 |
| JP | 2018005830 A | 1/2018 |
| KR | 101628503 B1 | 6/2016 |
| KR | 101947473 B1 | 4/2019 |

* cited by examiner

SENSOR CONTROL METHOD AND APPARATUS, AND SENSOR

CROSS-REFERENCE TO RELATED APPLICATIONS

This is a continuation of U.S. patent application Ser. No. 17/557,645, filed on Dec. 21, 2021, which is a continuation of International Patent Application No. PCT/CN2020/097296, filed on Jun. 20, 2020, which claims priority to Chinese Patent Application No. 201910542746.8, filed on Jun. 21, 2019. All of the aforementioned patent applications are hereby incorporated by reference in their entireties.

TECHNICAL FIELD

This application relates to vehicle driving technologies, and in particular, to a sensor control method and apparatus, and a sensor.

BACKGROUND

Long range radar (LRR) has ranging and anti-collision functions, and is widely applied to fields such as adaptive cruise control (ACC), forward collision warning (FCW), and automatic emergency braking (AEB). Middle range radar (MRR) and short range radar (SRR) have functions such as blind spot detection (BSD), lane change assistance (LCA), rear cross traffic alerting (RCTA), an exit assistant function (EAF), and forward cross traffic alerting (FCTA), and can accurately detect an object around a vehicle within a certain range. It can be learned that different application scenarios have different requirements for a detection distance of radar. The LRR, the MRR, and the SRR all play an important role in an advanced driver assistant system (ADAS).

In a related technology, the LRR is installed at a center position of a front bumper of the vehicle, and an azimuth angle is 0°. An elevation angle is set to 1.5° when a height is less than 50 cm, and the elevation angle is set to 0° when the height is greater than 50 cm. In this way, a moving object can be detected. For example, a truck, a car, and a pedestrian can be detected respectively at a distance of 150 meters, 100 meters, and 60 meters. The functions such as the ACC, the FCW, and the AEB of the LRR have significant safety warning effects when a driver is distracted, tired, or sleepy, or when the driver does not notice a situation in the front when using a mobile phone. As a typical application of the ADAS system, the SRR can effectively reduce, in fields such as the BSD and the LCA, a danger coefficient caused by inconvenient observation under harsh climates such as being at night, in fog, and in heavy rain. In addition, the SRR can avoid collision that occurs between an adjacent lane and a "vision" blind spot when the driver changes a lane.

However, a vehicle application is complex, and new applications keep emerging. In the future, a large quantity of different types of radar are required in a complex automatic driving scenario. On one hand, external space of the vehicle is limited, and it is difficult to install a plurality of types of radar for a plurality of applications at the same time. On the other hand, an increasing quantity of different types of radar increases complexity of management and control over vehicle-mounted radar.

SUMMARY

This application provides a sensor control method and apparatus, and a sensor, to improve flexible control of the sensor and save external space of a vehicle.

According to a first aspect, this application provides a sensor control method, including: obtaining first indication information, where the first indication information indicates a first scenario; determining a configuration parameter of at least one sensor based on the first indication information, where the configuration parameter is corresponding to the first scenario; and sending the configuration parameter to the at least one sensor.

In this application, the configuration parameter of the sensor is determined based on the first scenario, to implement that a same sensor supports measurement requirements of a vehicle in various cases during traveling. This improves flexible control of the sensor, and saves external space of the vehicle.

In a possible implementation, the determining a configuration parameter of at least one sensor based on the first indication information includes: generating a configuration parameter corresponding to the first scenario; or determining the configuration parameter according to at least one preset parameter correspondence. The parameter correspondence includes a correspondence between a scenario and a configuration parameter.

In this application, the configuration parameter may be determined in a plurality of manners, so that flexibility is improved.

In a possible implementation, the configuration parameter includes any one or more of the following parameters: an operation mode, a measurement period, and measurement time.

In a possible implementation, the method further includes: receiving a capability message sent by the at least one sensor; and determining a configuration parameter set based on the capability message. The configuration parameter belongs to the configuration parameter set.

In this application, the configuration parameter of the sensor is determined based on the first scenario, and the configuration parameter is configured based on a capability of the sensor. This avoids a system exception caused by parameter configuration when the sensor does not support the configuration.

In a possible implementation, the method further includes: receiving a configuration completion response message.

According to a second aspect, this application provides a sensor control method, including: receiving measurement information from at least one sensor; determining a first scenario based on the measurement information; and sending first indication information. The first indication information indicates the first scenario.

In a possible implementation, the measurement information includes at least one of speed information, pedestrian detection information, and positioning information. The determining a first scenario based on the measurement information includes: determining the first scenario based on at least one of the speed information, the pedestrian detection information, and the positioning information.

According to a third aspect, this application provides a sensor control method, including: reporting measurement information, where the measurement information includes at least one of speed information, pedestrian detection information, and positioning information; receiving a configuration parameter; and performing configuration based on the configuration parameter.

In a possible implementation, the method further includes: sending a capability message. The capability message indicates a function configuration supported by a sensor.

In a possible implementation, before the sending a capability message, the method further includes: downloading first-version software from a server. The sending a capability message includes: sending the capability message based on the first-version software.

In a possible implementation, the method further includes: sending a configuration completion response message. The configuration completion response message indicates that the sensor completes parameter configuration.

According to a fourth aspect, this application provides a sensor control apparatus, including an obtaining module, configured to obtain first indication information, where the first indication information indicates a first scenario; a determining module, configured to determine a configuration parameter of at least one sensor based on the first indication information, where the configuration parameter is corresponding to the first scenario; and a sending module, configured to send the configuration parameter to the at least one sensor.

In a possible implementation, the determining module is specifically configured to: generate a configuration parameter corresponding to the first scenario; or determine the configuration parameter according to at least one preset parameter correspondence. The parameter correspondence includes a correspondence between a scenario and a configuration parameter.

In a possible implementation, the configuration parameter includes any one or more of the following parameters: an operation mode, a measurement period, and measurement time.

In a possible implementation, the obtaining module is further configured to receive a capability message sent by the sensor. The determining module is further configured to determine a configuration parameter set based on the capability message. The configuration parameter belongs to the configuration parameter set.

In a possible implementation, the obtaining module is further configured to receive a configuration completion response message.

According to a fifth aspect, this application provides a sensor control apparatus, including a receiving module, configured to receive measurement information from at least one sensor; a determining module, configured to determine a first scenario based on the measurement information; and a sending module, configured to send first indication information. The first indication information indicates the first scenario.

In a possible implementation, the measurement information includes at least one of speed information, pedestrian detection information, and positioning information. The determining module is specifically configured to determine the first scenario based on at least one of the speed information, the pedestrian detection information, and the positioning information.

According to a sixth aspect, this application provides a sensor, including a sending module, configured to report measurement information, where the measurement information includes at least one of speed information, pedestrian detection information, and positioning information; a receiving module, configured to receive a configuration parameter; and a configuration module, configured to perform configuration based on the configuration parameter.

In a possible implementation, the sending module is further configured to send a capability message. The capability message indicates a function configuration supported by the sensor.

In a possible implementation, the receiving module is further configured to download first-version software from a server. The sending module is specifically configured to send the capability message based on the first-version software.

In a possible implementation, the sending module is further configured to send a configuration completion response message. The configuration completion response message indicates that the sensor completes parameter configuration.

According to a seventh aspect, this application provides a sensor control apparatus, including a receiving module, configured to receive measurement information from a sensor; a processing module, configured to determine a first scenario based on the measurement information and determine a configuration parameter of at least one sensor, where the configuration parameter is corresponding to the first scenario; a sending module, configured to send the configuration parameter to the at least one sensor.

In a possible implementation, the measurement information includes at least one of speed information, pedestrian detection information, and positioning information. The processing module is specifically configured to determine the first scenario based on at least one of the speed information, the pedestrian detection information, and the positioning information.

In a possible implementation, the processing module is specifically configured to: generate a configuration parameter corresponding to the first scenario; or determine the configuration parameter according to at least one preset parameter correspondence. The parameter correspondence includes a correspondence between a scenario and a configuration parameter.

In a possible implementation, the configuration parameter includes any one or more of the following parameters: an operation mode, a measurement period, and measurement time that are of the sensor.

In a possible implementation, the receiving module is further configured to receive a capability message sent by the sensor. The processing module is further configured to determine a configuration parameter set based on the capability message. The configuration parameter belongs to the configuration parameter set.

According to an eighth aspect, this application provides a sensor control system, including a control apparatus and a sensor. The control apparatus is the apparatus according to any one of the fourth aspect, the fifth aspect, or the seventh aspect, and the sensor is the sensor according to any one of the sixth aspect.

According to a ninth aspect, this application provides a computer-readable storage medium, including a computer program. When the computer program is executed on a computer, the computer is enabled to perform the method according to any one of the first aspect to the third aspect.

According to a tenth aspect, this application provides a computer program. When being executed by a computer, the computer program is used to perform the method according to any one of the first aspect to the third aspect.

According to an eleventh aspect, this application provides a chip, including a processor and a memory. The memory is configured to store a computer program, and the processor is configured to invoke and run the computer program stored in the memory, to perform the method according to any one of the first aspect to the third aspect.

DESCRIPTION OF EMBODIMENTS

To make the objectives, technical solutions, and advantages of this application clearer, the following clearly and completely describes the technical solutions in this application with reference to the accompanying drawings in this application. The described embodiments are merely a part rather than all of the embodiments of this application. All other embodiments obtained by a person of ordinary skill in the art based on the embodiments of this application without creative efforts shall fall within the protection scope of this application.

In the embodiments, claims, and the accompanying drawings of this specification in this application, the terms "first", "second" and the like are only used for a purpose of description, and cannot be understood as indicating or implying relative importance or a sequence. In addition, the terms "include", "have", and any variant thereof are intended to cover a non-exclusive inclusion, for example, include a series of steps or units. Methods, systems, products, or devices are not necessarily limited to those steps or units that are clearly listed, but may include other steps or units that are not clearly listed or inherent to such processes, methods, products, or devices.

It should be understood that in this application, "at least one" means one or more, and "a plurality of" means two or more. The term "and/or" is used to describe an association relationship between associated objects, and indicates that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following" or a similar expression thereof indicates any combination of the following, including any combination of one or more of the following. For example, at least one of a, b, or c may indicate a, b, c, "a and b", "a and c", "b and c", or "a, b, and c", where a, b, and c may be singular or plural.

Figure 1:
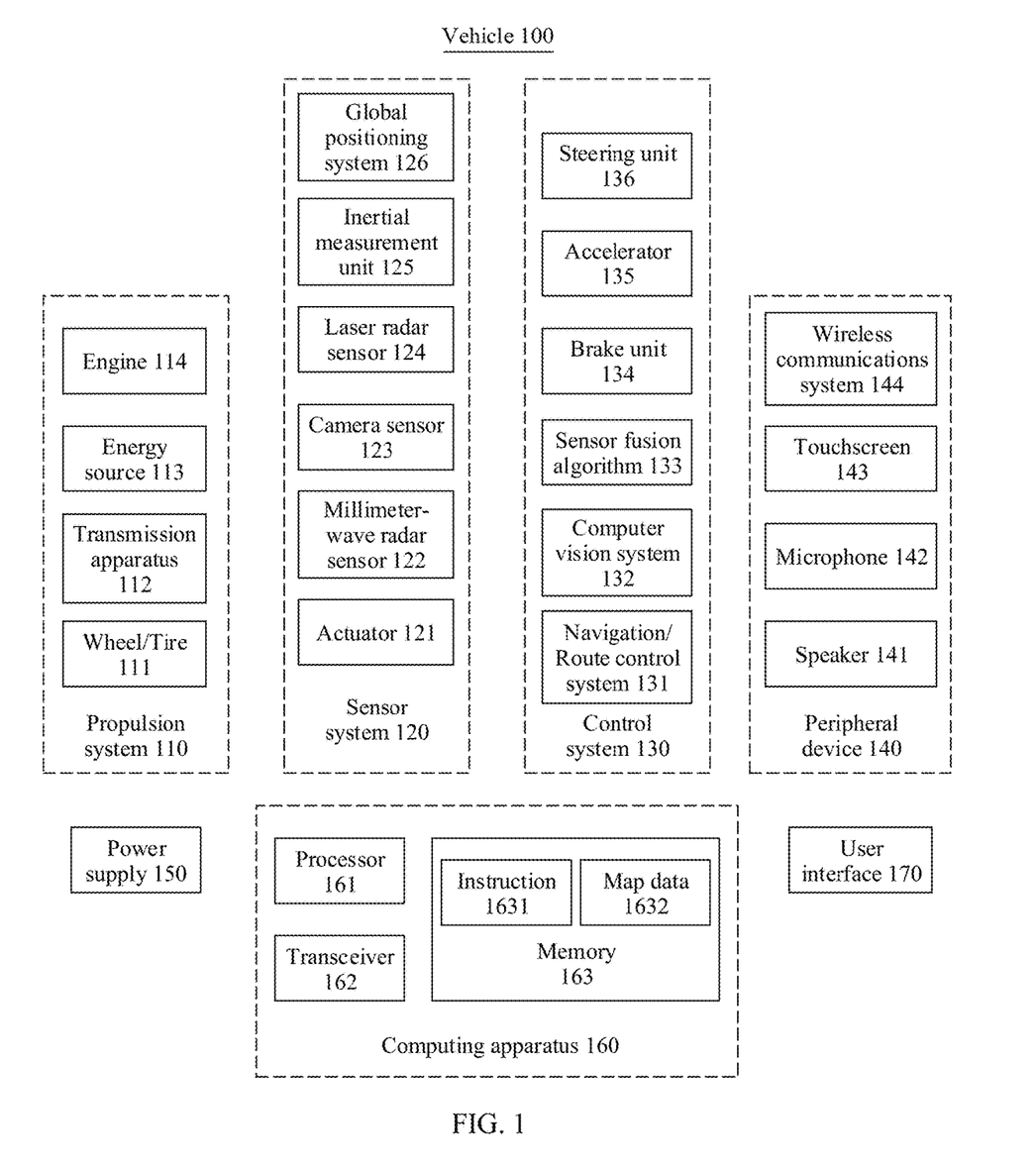
FIG. 1 is an example of a functional block diagram of a vehicle 100 according to an embodiment of this application.

FIG. 1 is an example of a functional block diagram of a vehicle 100 according to an embodiment of this application. As shown in FIG. 1, components coupled to or included in the vehicle 100 may include a propulsion system 110, a sensor system 120, a control system 130, a peripheral device 140, a power supply 150, a computing apparatus 160, and a user interface 170. The components of the vehicle 100 may be configured to work in a manner of interconnection with each other and/or interconnection with other components coupled to various systems. For example, the power supply 150 may supply power to all components of the vehicle 100. The computing apparatus 160 may be configured to: receive data from the propulsion system 110, the sensor system 120, the control system 130, and the peripheral device 140, and control the propulsion system 110, the sensor system 120, the control system 130, and the peripheral device 140. The computing apparatus 160 may be further configured to: generate a display of an image at the user interface 170, and receive an input from the user interface 170.

It should be noted that, in another example, the vehicle 100 may include more, fewer, or different systems, and each system may include more, fewer, or different components. In addition, the shown systems and components may be combined or split in any manner. This is not specifically limited in this application.

The computing apparatus 160 may include a processor 161, a transceiver 162, and a memory 163. The computing apparatus 160 may be a controller of the vehicle 100 or a part of the controller. The memory 163 may store an instruction 1631 that is run on the processor 161, and may further store map data 1632. The processor 161 included in the computing apparatus 160 may include one or more general purpose processors and/or one or more dedicated processors (for example, an image processor or a digital signal processor). If the processor 161 includes more than one processor, the processor may work independently or work in combination. The computing apparatus 160 may implement a function of controlling the vehicle 100 based on the input received by the user interface 170. The transceiver 162 is configured to perform communication between the computing apparatus 160 and each system. The memory 163 may further include one or more volatile storage components and/or one or more non-volatile storage components, such as an optical, magnetic, and/or organic storage apparatus. The memory 163 may be integrated with the processor 161 in whole or in part. The memory 163 may include the instruction 1631 (for example, program logic) that is run by the processor 161, to run various vehicle functions, including any one of the functions or methods described in this specification.

The propulsion system 110 may be configured to provide powered motion for the vehicle 100. As shown in FIG. 1, the propulsion system 110 may include an engine 114, an energy source 113, a transmission apparatus 112, and a wheel/tire 111. In addition, the propulsion system 110 may additionally or alternatively include another component other than the components shown in FIG. 1. This is not limited in this embodiment of this application.

The sensor system 120 may include several sensors configured to sense information about an environment in which the vehicle 100 is located. As shown in FIG. 1, sensors of the sensor system 120 include a Global Positioning System (GPS) 126, an inertial measurement unit (IMU) 125, a laser radar sensor 124, a camera sensor 123, a millimeter-wave radar sensor 122, and a brake 121 configured to modify a position and/or an orientation of a sensor. The GPS 126 may be any sensor configured to estimate a geographic location of the vehicle 100. Therefore, the GPS 126 may include a transceiver that estimates a position of the vehicle 100 relative to the earth based on satellite positioning data. In an example, the computing apparatus 160 may be configured to estimate, with reference to the map data 1632 by using the GPS 126, a road on which the vehicle 100 travels. The IMU 125 may be configured to sense position and orientation changes of the vehicle 100 based on inertial acceleration and any combination thereof. In some examples, a combination of sensors in the IMU 125 may include an accelerometer and a gyroscope. In addition, another combination of sensors in the IMU 125 is also possible. The laser radar sensor 124 may be considered as an object detection system, and the sensor senses or detects, by using light, an object in the environment in which the vehicle 100 is located. Usually, the laser radar sensor 124 may use an optical remote sensing technology in which a distance to a target or another attribute of the target is measured by using the light to illuminate the target. The laser radar sensor 124 may include a laser source and/or a laser scanner configured to emit a laser pulse, and a detector configured to receive reflection of the laser pulse. For example, the laser radar sensor 124 may include a laser rangefinder based on reflection by a rotation mirror, and perform laser scanning around a digital scene in one dimension or two dimensions, to collect distance measurement values from a specified angle at specified intervals. In the example, the laser radar sensor 124 may include components such as a light (for example, laser) source, a scanner, an optical system, an optical detector, a receiver or an electronic component, and a position and navigation system. The laser radar sensor 124 determines a distance to an object by scanning a laser reflected from the object, and may form a 3D environmental diagram with precision of up to a centimeter level. The camera sensor 123 may be any camera (such as a static camera or a video camera) configured to obtain an image of the environment in which the vehicle 100 is located. Therefore, the camera sensor 123 may be configured to detect visible light, or may be configured to detect light from another part (such as infrared light or ultraviolet light) of a spectrum. Another type of camera sensor 123 is also possible. The camera sensor 123 may be a two-dimensional detector, or may have a three-dimensional space range detection function. In some examples, the camera sensor 123 may be, for example, a distance detector, configured to generate a two-dimensional image indicating a distance from the camera sensor 123 to several points in the environment. For this purpose, the camera sensor 123 may use one or more distance detection technologies. For example, the camera sensor 123 may be configured to use a structured light technology. The vehicle 100 illuminates the object in the environment by using a predetermined light pattern, such as a grid or checkerboard pattern, and detects reflection of the predetermined light pattern from the object by using the camera sensor 123. Based on distortion in a reflected light pattern, the vehicle 100 may be configured to detect a distance to a point on the object. The predetermined light pattern may include the infrared light or light of another wavelength. The millimeter-wave radar sensor 122 is usually an object detection sensor with a wavelength of 1-10 millimeters (mm) and a frequency range of approximately 10 gigahertz (GHz) to 200 GHz. A measurement value of the millimeter-wave radar sensor 122 has depth information that can provide the distance to the target. In addition, the millimeter-wave radar sensor 122 has an obvious Doppler effect, and is very sensitive to a speed. Therefore, a speed of the target may be directly obtained, and the speed of the target may be extracted by detecting a Doppler frequency shift of the target. Currently, two common frequency bands used by vehicle-mounted millimeter-wave radar are 24 GHz and 77 GHz. A wavelength of the 24 GHz frequency band is about 1.25 cm and is mainly used for short-distance sensing, such as parking assistance, lane change assistance, and sensing a surrounding environment of a vehicle and a blind spot. A wavelength of the 77 GHz frequency band is about 4 mm and is used for medium- and long-distance measurement, such as automatic following, ACC, and AEB.

The sensor system 120 may also include additional sensors, including, for example, sensors that monitor an internal system of the vehicle 100 (For example, an $O_2$ monitor, a fuel gauge, an engine oil temperature gauge, and the like). The sensor system 120 may further include another sensor. This is not limited in this embodiment of this application.

The control system 130 may be configured to control operations of both the vehicle 100 and the components of the vehicle 100. Therefore, the control system 130 may include a steering unit 136, an accelerator 135, a brake unit 134, a sensor fusion algorithm 133, a computer vision system 132, and a navigation/route control system 131. The control system 130 may additionally or alternatively include another component other than the components shown in FIG. 1. This is not limited in this embodiment of this application.

The peripheral device 140 may be configured to allow the vehicle 100 to interact with an external sensor, another vehicle, and/or a user. Therefore, the peripheral device 140 may include, for example, a wireless communications system 144, a touchscreen 143, a microphone 142, and/or a speaker 141. The peripheral device 140 may additionally or alternatively include another component other than the components shown in FIG. 1. This is not limited in this embodiment of this application.

The power supply 150 may be configured to supply power to some or all components of the vehicle 100. Therefore, the power supply 150 may include, for example, a rechargeable lithium-ion or lead-acid battery. In some examples, one or more battery groups may be configured to supply power. Other power materials and configurations are also possible. In some examples, the power supply 150 and the energy source 113 may be implemented together, as in some pure electric vehicles.

The components of the vehicle 100 may be configured to work in a manner of interconnection with other components inside and/or outside their respective systems. Therefore, the components and systems of the vehicle 100 may be communicatively linked together through a system bus, a network, and/or another connection mechanism.

Figure 2:
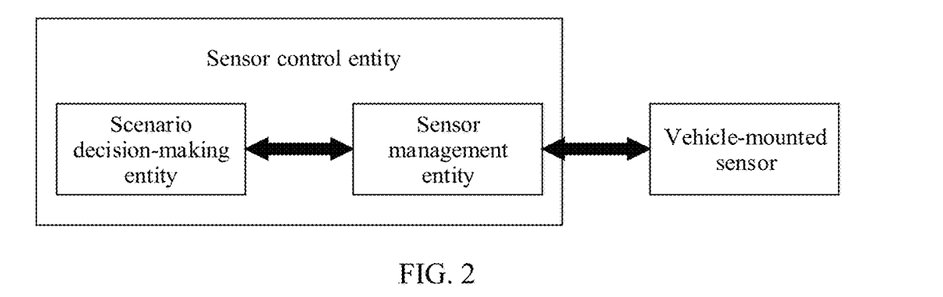
FIG. 2 is an example of a functional block diagram of a sensor control system according to an embodiment of this application.

FIG. 2 is an example of a functional block diagram of a sensor control system according to an embodiment of this application. As shown in FIG. 2, the system can be used in a vehicle or another carrier using the system. The following uses the vehicle as a carrier for description. The system includes at least one installed sensor and a sensor control entity. The sensor control entity may further include a sensor management entity and a scenario decision-making entity. The sensor may be any one or more sensors in the sensor system 120 shown in FIG. 1. The sensor management entity and the scenario decision-making entity may be integrated into one entity device as a whole. The entity device may be, for example, the computing apparatus 160 shown in FIG. 1. Alternatively, the sensor management entity and the scenario decision-making entity may be two independent entity devices. The two independent entity devices may be separately, for example, the computing apparatus 160 shown in FIG. 1, or the two independent entity devices may be separately an entity including the processor 161 and the transceiver 162 in the computing apparatus 160 shown in FIG. 1. Then, the two independent entity devices share the memory 163. It should be noted that the sensor management entity and the scenario decision-making entity in this application may be implemented in any implementable combination manner. This is not specifically limited in this application.

To better understand the embodiments of this application, the following uses a system that is the same as or similar to the system shown in FIG. 2 as an example to describe the embodiments of this application.

Figure 3:
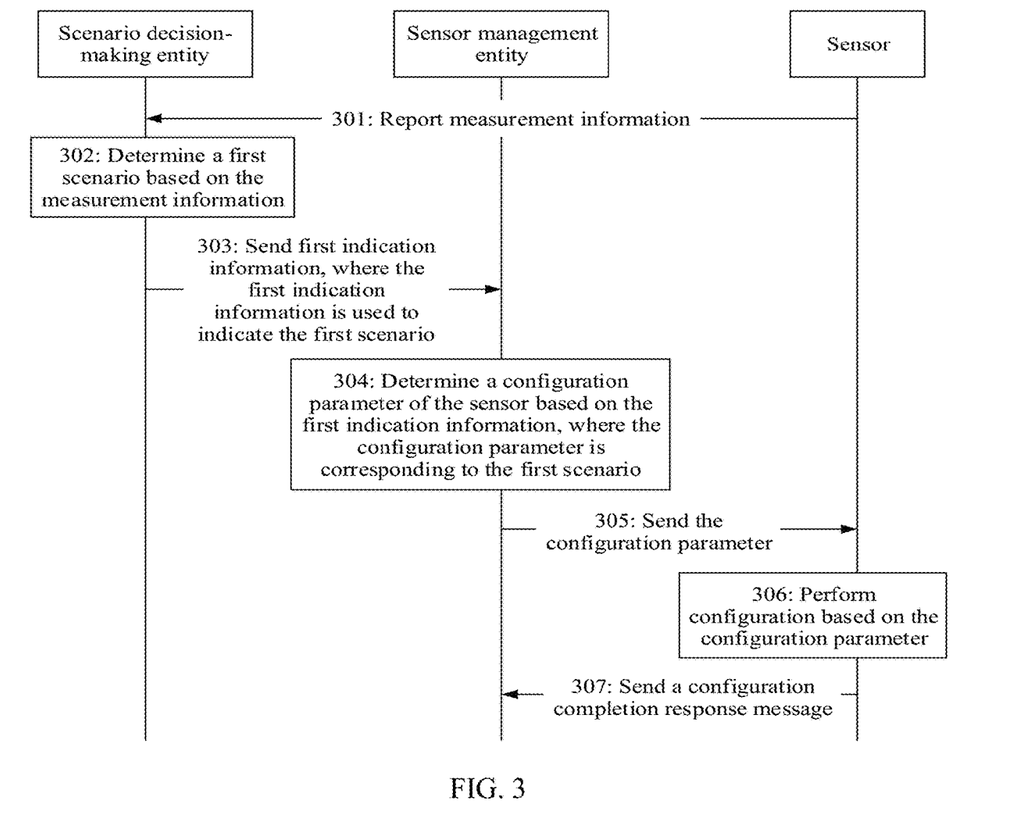
FIG. 3 is a flowchart of a sensor control method according to an embodiment of this application.

FIG. 3 is a flowchart of a sensor control method according to an embodiment of this application. As shown in FIG. 3, the method in this embodiment may include the following steps.

Step 301: At least one sensor reports measurement information.

As described above, in some examples, the at least one sensor may include at least one of a GPS 126, an IMU 125, a laser radar sensor 124, a camera sensor 123, a millimeter-wave radar sensor 122, and a brake 121.

In some other examples, the sensor may further include at least one of an oxygen ($O_2$) monitor, a fuel gauge, an engine oil temperature gauge, and the like.

For example, the GPS 126 may be any sensor configured to estimate a geographic location of a vehicle 100. The IMU 125 may be configured to sense position and orientation changes of the vehicle 100 based on inertial acceleration and any combination thereof. A combination of sensors in the IMU 125 may include, for example, an accelerometer and a gyroscope. The laser radar sensor 124 may be considered as an object detection system, and the sensor measures a distance to a target by illuminating the target by using light. The camera sensor 123 may be any camera (such as a static camera or a video camera) configured to obtain an image of an environment in which the vehicle 100 is located. In some examples, the camera sensor 123 may be, for example, a distance detector, configured to generate a two-dimensional image indicating a distance from the camera sensor 123 to several points in the environment. For this purpose, the camera sensor 123 may use one or more distance detection technologies. A measurement value of the millimeter-wave radar sensor 122 has depth information that can provide the distance to the target. In addition, the millimeter-wave radar sensor 122 has an obvious Doppler effect, and is very sensitive to a speed. Therefore, a speed of the target may be directly obtained, and the speed of the target may be extracted by detecting a Doppler frequency shift of the target. Currently, two common frequency bands used by vehicle-mounted millimeter-wave radar are 24 GHz and 77 GHz. A wavelength of the 24 GHz frequency band is about 1.25 cm and is mainly used for short-distance sensing, such as parking assistance, lane change assistance, and sensing a surrounding environment of a vehicle and a blind spot. A wavelength of the 77 GHz frequency band is about 4 mm and is used for medium- and long-distance measurement, such as automatic following, ACC, and AEB.

It can be learned that when the sensor is installed on the vehicle, measurement information such as longitude, latitude, a speed, an orientation, and a distance to a surrounding object that are of the vehicle and that are sensed by the sensor may be obtained in real time or periodically. Then, assisted driving or unmanned driving of the vehicle is implemented based on the measurement information. For example, a position of the vehicle is determined through the longitude and the latitude. Alternatively, a traveling direction and a destination of the vehicle in a future period of time are determined through the speed and the orientation. Alternatively, a quantity of obstacles, density of the obstacles, and the like are determined through the distance to the surrounding object, where the obstacles are around the vehicle. In this application, the measurement information may include at least one of speed information, pedestrian detection information, and positioning information. The pedestrian detection information may include a quantity of pedestrians, positions of the pedestrians, and density of the pedestrians, where the pedestrians are in the surrounding environment. The positioning information may include latitude and longitude of a current position, a mark of the latitude and longitude on a map, or the like.

The sensor may perform measurement periodically, and then report the measurement information to a sensor management entity. The sensor management entity forwards the measurement information to a scenario decision-making entity, or the sensor directly reports the measurement information to the scenario decision-making entity.

Step 302: A scenario decision-making entity determines a first scenario based on the measurement information.

The first scenario indicates a scenario in which a sensor carrier is located. In some examples, the measurement information reported by the sensor can reflect a position, a speed, an orientation, a distance to a surrounding object, and the like of the sensor carrier. The scenario decision-making entity may classify the measurement information in advance based on different values of the measurement information, and set a name for each category. In this way, a correspondence between a name of a category and an actual value of measurement information may be established. For example, different scenario names are used to indicate different types of measurement information. It is assumed that the scenario names include a downtown scenario, a suburban scenario, and a highway scenario. Measurement information corresponding to the downtown scenario may include, for example, a quantity of surrounding pedestrians (the quantity is greater than a first threshold), a distance to the surrounding pedestrian (the distance is less than or equal to a second threshold), a speed (the speed is less than or equal to a third threshold), a position (it may be determined, by combining the position with map data, that a road corresponding to the position belongs to a downtown area), and the like. Measurement information corresponding to the suburban scenario may include, for example, a quantity of surrounding pedestrians (the quantity is less than or equal to the first threshold and greater than a fourth threshold), a distance to the surrounding pedestrian (the distance is greater than the second threshold and less than or equal to a sixth threshold), a speed (the speed is greater than the third threshold and less than or equal to a seventh threshold), a position (it may be determined, by combining the position with the map data, that a road corresponding to the position belongs to a suburban area), and the like. Measurement information corresponding to the highway scenario may include, for example, a quantity of surrounding pedestrians (the quantity is less than or equal to the fourth threshold), a distance to the surrounding pedestrian (the distance is greater than the sixth threshold), a speed (the speed is greater than the seventh threshold), a position (it may be determined, by combining the position with the map data, that a road corresponding to the position belongs to a highway), and the like.

It can be learned that the scenario decision-making entity may determine, based on a specific value of the obtained measurement information, the category to which the obtained measurement information belongs, namely, the name of the category. In this application, the first scenario is the name of the category to which the specific value of the determined measurement information belongs.

Step 303: The scenario decision-making entity sends first indication information to a sensor management entity, where the first indication information indicates the first scenario.

In this application, after the scenario decision-making entity determines the first scenario, when a category of the first scenario is the same as a category of a first scenario determined last time, this indicates that a category of a scenario in which the carrier of the sensor is located does not change. Therefore, the scenario decision-making entity may choose not to send the first indication information. Alternatively, the scenario decision-making entity may choose to send the first indication information to the sensor management entity, and the sensor management entity determines whether to reconfigure a configuration parameter of the sensor. When the category of the first scenario is different from the category of the first scenario determined last time, this indicates that the category of the scenario in which the carrier of the sensor is located changes. Therefore, the scenario decision-making entity needs to send the first indication information to the sensor management entity, to trigger the sensor management entity reconfiguring the configuration parameter of the sensor.

Step 304: The sensor management entity determines a configuration parameter of the sensor based on the first indication information, where the configuration parameter is corresponding to the first scenario.

As described above, the scenario decision-making entity classifies the measurement information in advance based on different values of the measurement information, and sets the name for each category. In this way, the correspondence between a name of a category and an actual value of measurement information may be established. However, in the sensor management entity, a correspondence between a name of a category and a configuration parameter of a sensor is pre-established. The configuration parameter may include, for example, any one or more of an operation mode, a measurement period, and measurement time that are of the sensor.

As described above, in some examples, the at least one sensor may include at least one of the GPS 126, the IMU 125, the laser radar sensor 124, the camera sensor 123, the millimeter-wave radar sensor 122, and the brake 121.

In some other examples, the sensor may further include at least one of the $O_2$ monitor, the fuel gauge, the engine oil temperature gauge, and the like.

Each sensor may configure an operation mode, a measurement period, measurement time, and the like for at least one of the $O_2$ monitor, the fuel gauge, the engine oil temperature gauge, and the like. For example, the GPS 126 may include a high-precision positioning mode (for example, may be accurate to a house number) and a low-precision positioning mode (for example, may be accurate to a road level). The IMU 125 and the camera sensor 123 may include periodic measurement (for example, performing measurement based on the configured measurement period) and event-triggered measurement (for example, performing measurement based on a specified event, where the event may be, for example, that a vehicle speed change exceeds a specified threshold). The laser radar sensor 124 and the millimeter-wave radar sensor 122 may include an LRR mode, an MRR mode, an SRR mode, and the like. Based on performance of the foregoing sensors, working statuses of the at least one of the $O_2$ monitor, the fuel gauge, the engine oil temperature gauge, and the like may be controlled by the configuration parameter.

For example, different scenario names are used to indicate different types of measurement information. It is assumed that the scenario names include the downtown scenario, the suburban scenario, and the highway scenario. A configuration parameter corresponding to the downtown scenario may include: The GPS 126 works in the high-precision positioning mode, the IMU 125 and the camera sensor 123 report the measurement information at a fixed time interval in a set period, and the laser radar sensor 124 and the millimeter-wave radar sensor 122 work in the SRR mode. A configuration parameter corresponding to the suburban scenario may include: The GPS 126 works in the low-precision positioning mode, the IMU 125 reports the measurement information at the fixed time interval in the set period, the camera sensor 123 reports the measurement information when detecting that a pedestrian appears in a specified range, and the laser radar sensor 124 and the millimeter-wave radar sensor 122 work in the MRR mode. A configuration parameter corresponding to the highway scenario may include: The GPS 126 works in the low-precision positioning mode, the IMU 125 and the camera sensor 123 report the measurement information when detecting that a pedestrian or a vehicle appears in the specified range, and the laser radar sensor 124 and the millimeter-wave radar sensor 122 work in the LRR mode.

After the first scenario is obtained, it can be learned that, the sensor management entity may directly generate, according to the correspondence between a name of a category and a configuration parameter of a sensor, the configuration parameter corresponding to the first scenario, or search, according to the correspondence, locally stored configuration parameters for the configuration parameter matching the first scenario. In this way, the sensor works in a corresponding manner under control of the configuration parameter.

In a possible implementation, after receiving the first indication information, the sensor management entity may first determine whether the first scenario indicated by the first indication information is the same as a first scenario obtained when the configuration parameter of the sensor is configured last time. If the two first scenarios are the same, the configuration parameter of the sensor does not need to be reconfigured. If the two first scenarios are different, the configuration parameter of the sensor needs to be reconfigured. For example, if the first scenario obtained when the configuration parameter of the sensor is configured last time is the downtown scenario, and the first scenario indicated by the first indication information received this time is the suburban scenario, the sensor management entity needs to reconfigure the configuration parameter of the sensor based on the suburban scenario. Alternatively, if the first scenario obtained when the configuration parameter of the sensor is configured last time is the highway scenario, and the first scenario indicated by the first indication information received this time is the downtown scenario, the sensor management entity needs to reconfigure the configuration parameter of the sensor based on the downtown scenario.

Step 305: The sensor management entity sends the configuration parameter to the sensor.

Step 306: The sensor performs configuration based on the configuration parameter.

After receiving the configuration parameter reconfigured by the sensor management entity, the sensor completes its own configuration based on a specific value of the configuration parameter. For example, the GPS 126 is configured to work in the high-precision positioning mode, the IMU 125 and the camera sensor 123 report the measurement information at the fixed time interval in the set period, and the laser radar sensor 124 and the millimeter-wave radar sensor 122 work in the SRR mode. Alternatively, the GPS 126 works in the low-precision positioning mode, the IMU 125 reports the measurement information at the fixed time interval in the set period, the camera sensor 123 reports the measurement information when detecting that a pedestrian appears in the specified range, and the laser radar sensor 124 and the millimeter-wave radar sensor 122 work in the MRR mode. Alternatively, the GPS 126 works in the low-precision positioning mode, the IMU 125 and the camera sensor 123 report the measurement information when detecting that a pedestrian or a vehicle appears in the specified range, and the laser radar sensor 124 and the millimeter-wave radar sensor 122 work in the LRR mode.

It can be learned that the sensor may work under different values of the configuration parameter to adapt to different first scenarios. In this way, control methods are flexible and diverse, and are also efficient at the same time.

Step 307: The sensor sends a configuration completion response message to the sensor management entity.

The sensor notifies the sensor management entity of completion of parameter configuration through the configuration completion response message. In this application, the configuration parameter of the sensor is determined based on the first scenario, to implement that a same sensor supports measurement requirements in various cases during traveling of a vehicle. In this case, flexible control of the sensor is improved, and external space of the vehicle can be saved.

Figure 4:
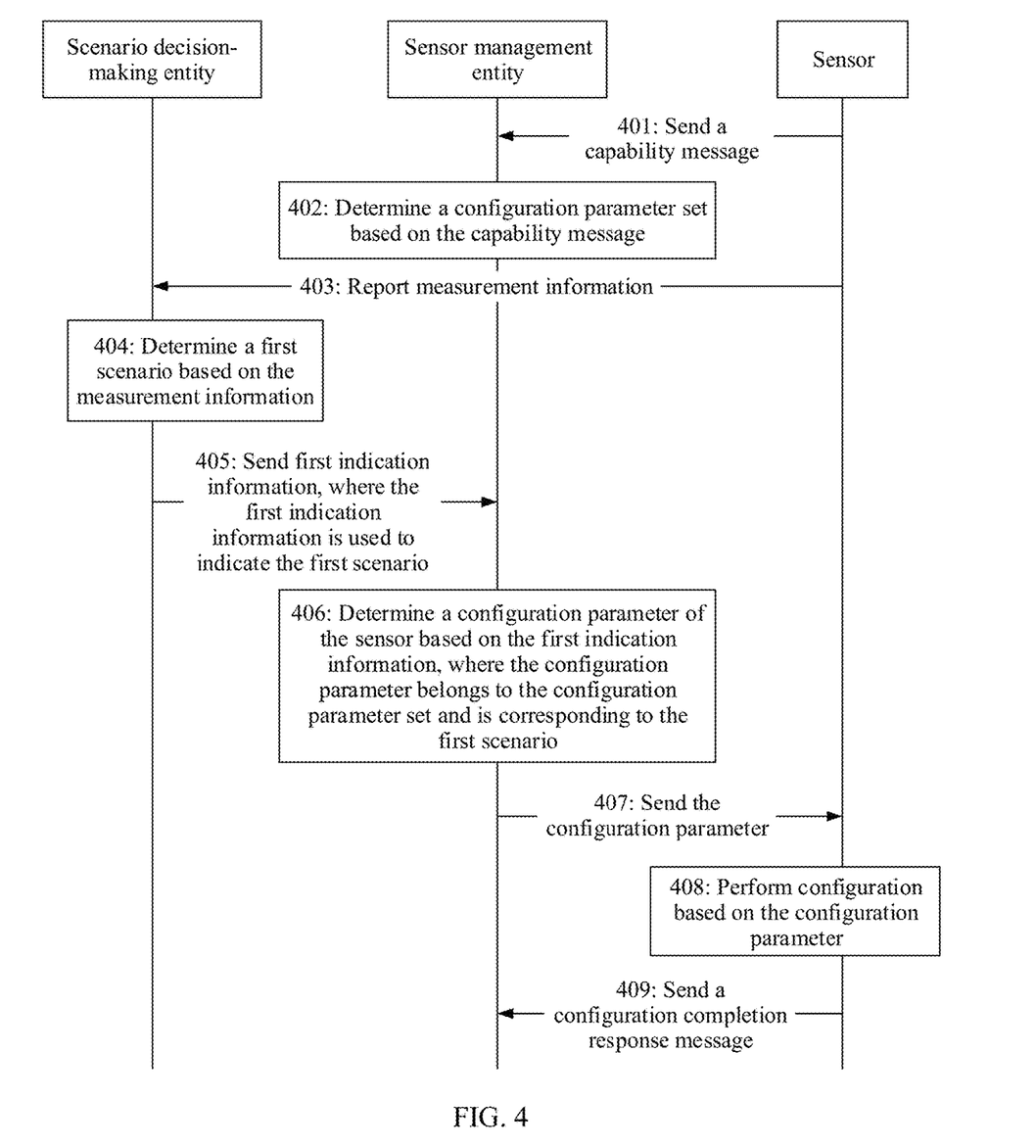
FIG. 4 is another flowchart of a sensor control method according to an embodiment of this application.

FIG. 4 is another flowchart of a sensor control method according to an embodiment of this application. As shown in FIG. 4, the method in this embodiment may include the following steps.

Step 401: At least one sensor sends a capability message to a sensor management entity.

Before a system works or when a capability of any sensor changes, the at least one sensor notifies the sensor management entity of a current capability of the at least one sensor, namely, a supported function configuration, for example, whether parameter configuration is supported, whether a plurality of operation modes are supported, and which operation modes and parameter configuration are supported. In some examples, the at least one sensor may download first-version software through a server. The first-version software is higher than existing-version software of the sensor. For example, the first-version software is upgraded compared with the existing-version software in terms of measurement precision, algorithm, and/or function of the sensor. After the first-version software is installed, the sensor may upgrade a version of the sensor. After the upgrade, the sensor sends the capability message to inform the sensor management entity of the function configuration supported after the upgrade.

Step 402: The sensor management entity determines a configuration parameter set based on the capability message.

Based on the capability message of the at least one sensor, the sensor management entity may determine whether the sensor supports the parameter configuration, whether the sensor supports the plurality of operation modes, and which operation modes, parameter configuration, and the like that the sensor supports, to determine the configuration parameter set.

As described above, in some examples, the at least one sensor may include at least one of a GPS 126, an IMU 125, a laser radar sensor 124, a camera sensor 123, a millimeter-wave radar sensor 122, and a brake 121.

In some other examples, the sensor may further include at least one of an $O_2$ monitor, a fuel gauge, an engine oil temperature gauge, and the like.

Limited by the capability, each sensor supports different operation modes, measurement periods, and measurement time periods. For example, the GPS 126 may include a high-precision positioning mode (for example, may be accurate to a house number) and a low-precision positioning mode (for example, may be accurate to a road level), or may not support a mode change, namely, the GPS 126 can work only in one mode. The IMU 125 and the camera sensor 123 may support periodic measurement (for example, performing measurement based on the configured measurement period) and event-triggered measurement (for example, performing measurement based on a specified event, where the event may be, for example, that a vehicle speed change exceeds a specified threshold), or may support only one of the foregoing two measurement manners. The laser radar sensor 124 and the millimeter-wave radar sensor 122 may support three modes: an LRR mode, an MRR mode, and an SRR mode.

Therefore, after the capability message is received, the configuration parameter set of the sensor is determined based on the capability of the sensor, namely, values of which configuration parameters can be configured for the sensor are determined.

Step 403: The at least one sensor reports measurement information.

A technical principle of step 403 in this embodiment is similar to that of step 301 in Embodiment 1 of the foregoing method, and details are not described herein again.

Step 404: A scenario decision-making entity determines a first scenario based on the measurement information.

A technical principle of step 404 in this embodiment is similar to that of step 302 in Embodiment 1 of the foregoing method, and details are not described herein again.

Step 405: The scenario decision-making entity sends first indication information to a sensor management entity, where the first indication information indicates the first scenario.

A technical principle of step 405 in this embodiment is similar to that of step 303 in Embodiment 1 of the foregoing method, and details are not described herein again.

Step 406: The sensor management entity determines a configuration parameter of the sensor based on the first indication information, where the configuration parameter belongs to the configuration parameter set and is corresponding to the first scenario.

The sensor management entity determines, from the configuration parameter set determined in step 402, the configuration parameter corresponding to the first scenario, namely, the configuration parameter set limits a range of the configuration parameter for the sensor management entity. The sensor management entity can determine the configuration parameter only within the range of the configuration parameter. This avoids a system exception caused by the parameter configuration when the sensor does not support the configuration.

Step 407: The sensor management entity sends the configuration parameter to the sensor.

A technical principle of step 407 in this embodiment is similar to that of step 305 in Embodiment 1 of the foregoing method, and details are not described herein again.

Step 408: The sensor performs configuration based on the configuration parameter.

A technical principle of step 408 in this embodiment is similar to that of step 306 in Embodiment 1 of the foregoing method, and details are not described herein again.

Step 409: The sensor sends a configuration completion response message to the sensor management entity.

A technical principle of step 409 in this embodiment is similar to that of step 307 in Embodiment 1 of the foregoing method, and details are not described herein again.

In this application, the configuration parameter of the sensor is determined based on the first scenario, and the configuration parameter is configured based on the capability of the sensor. This avoids the system exception caused by the parameter configuration when the sensor does not support the configuration.

Figure 5:
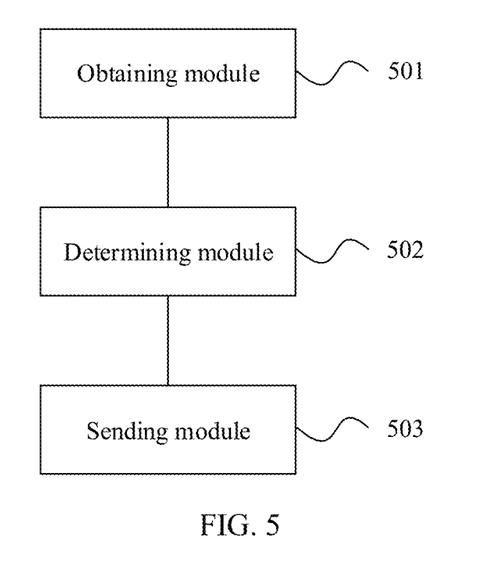
FIG. 5 is a schematic structural diagram of a sensor control apparatus according to an embodiment of this application.

FIG. 5 is a schematic structural diagram of a sensor control apparatus according to an embodiment of this application. As shown in FIG. 5, the apparatus in this embodiment may be applied to the foregoing sensor management entity. The apparatus includes an obtaining module 501, a determining module 502, and a sending module 503. The obtaining module 501 is configured to obtain first indication information. The first indication information indicates a first scenario. The determining module 502 is configured to determine a configuration parameter of at least one sensor based on the first indication information. The configuration parameter is corresponding to the first scenario. The sending module 503 is configured to send the configuration parameter to the at least one sensor.

In a possible implementation, the determining module 502 is specifically configured to: generate the configuration parameter corresponding to the first scenario; or determine the configuration parameter according to at least one preset parameter correspondence. The parameter correspondence includes a correspondence between a scenario and a configuration parameter.

In a possible implementation, the configuration parameter includes any one or more of the following parameters: an operation mode, a measurement period, and measurement time that are of the sensor.

In a possible implementation, the obtaining module 501 is further configured to receive a capability message sent by the sensor. The determining module 502 is further configured to determine a configuration parameter set based on the capability message. The configuration parameter belongs to the configuration parameter set.

In a possible implementation, the obtaining module 501 is further configured to receive a configuration completion response message.

Figure 6:
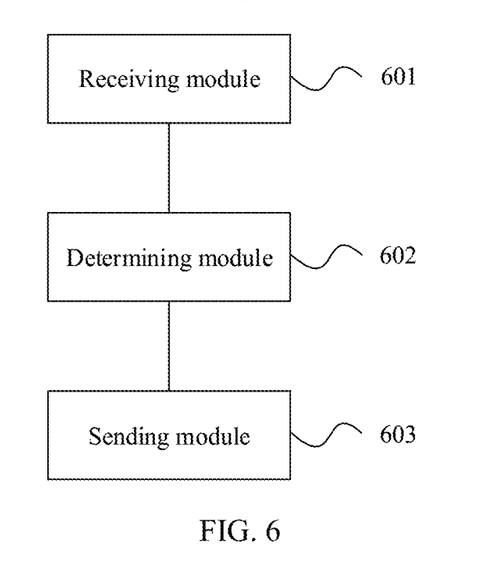
FIG. 6 is another schematic structural diagram of a sensor control apparatus according to an embodiment of this application.

FIG. 6 is another schematic structural diagram of a sensor control apparatus according to an embodiment of this application. As shown in FIG. 6, the apparatus in this embodiment may be applied to the foregoing scenario decision-making entity. The apparatus includes a receiving module 601, a determining module 602, and a sending module 603. The receiving module 601 is configured to receive measurement information from a sensor. The determining module 602 is configured to determine a first scenario based on the measurement information. The sending module 603 is configured to send first indication information. The first indication information indicates the first scenario.

Figure 7:
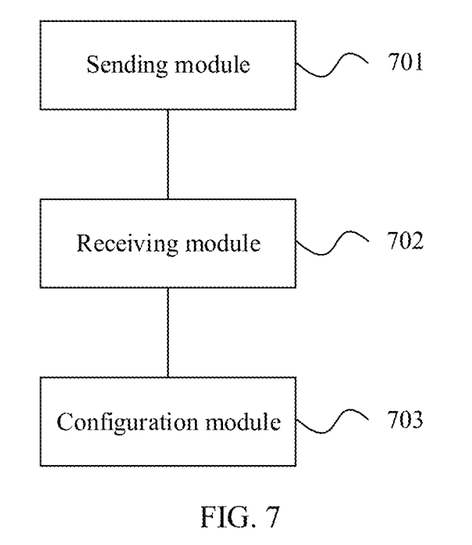
FIG. 7 is a schematic structural diagram of a sensor according to an embodiment of this application.

In a possible implementation, the measurement information includes at least one of speed information, pedestrian detection information, and positioning information. The determining module 602 is specifically configured to determine the first scenario based on at least one of the speed information, the pedestrian detection information, and the positioning information. FIG. 7 is a schematic structural diagram of a sensor according to an embodiment of this application. As shown in FIG. 7, the apparatus in this embodiment may include a sending module 701, a receiving module 702, and a configuration module 703. The sending module 701 is configured to report measurement information. The measurement information includes at least one of speed information, pedestrian detection information, and positioning information. The receiving module 702 is configured to receive a configuration parameter. The configuration module 703 is configured to perform configuration based on the configuration parameter.

In a possible implementation, the sending module 701 is further configured to send a capability message. The capability message indicates a function configuration supported by the sensor.

In a possible implementation, the receiving module 702 is further configured to download first-version software from a server. The sending module 701 is specifically configured to send the capability message based on the first-version software.

In a possible implementation, the sending module 701 is further configured to send a configuration completion response message. The configuration completion response message indicates that the sensor completes parameter configuration.

Figure 8:
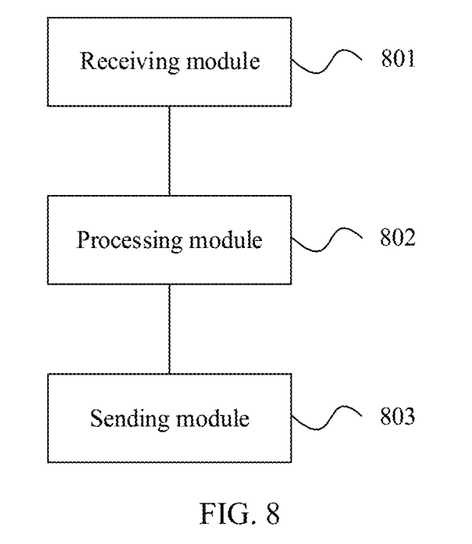
FIG. 8 is still another schematic structural diagram of a sensor control apparatus according to an embodiment of this application.

FIG. 8 is still another schematic structural diagram of a sensor control apparatus according to an embodiment of this application. As shown in FIG. 8, the apparatus in this embodiment may include a receiving module 801, a processing module 802, and a sending module 803. The receiving module 801 is configured to receive measurement information from a sensor. The processing module 802 is configured to: determine a first scenario based on the measurement information; and determine a configuration parameter of at least one sensor. The configuration parameter is corresponding to the first scenario. The sending module 803 is configured to send the configuration parameter to the at least one sensor.

In a possible implementation, the measurement information includes at least one of speed information, pedestrian detection information, and positioning information. The processing module 802 is specifically configured to determine the first scenario based on at least one of the speed information, the pedestrian detection information, and the positioning information.

In a possible implementation, the processing module 802 is specifically configured to: generate the configuration parameter corresponding to the first scenario; or determine the configuration parameter according to at least one preset parameter correspondence. The parameter correspondence includes a correspondence between a scenario and a configuration parameter.

In a possible implementation, the configuration parameter includes any one or more of the following parameters: an operation mode, a measurement period, and measurement time that are of the sensor.

In a possible implementation, the receiving module 801 is further configured to receive a capability message sent by the sensor. The processing module 802 is further configured to determine a configuration parameter set based on the capability message. The configuration parameter belongs to the configuration parameter set.

The foregoing apparatus embodiment may be used to execute the technical solution of the method embodiment shown in FIG. 2 or FIG. 3. Implementation principles and technical effects of the apparatus embodiment are similar to those of the method embodiment shown in FIG. 2 or FIG. 3, and details are not described herein again.

Figure 9:
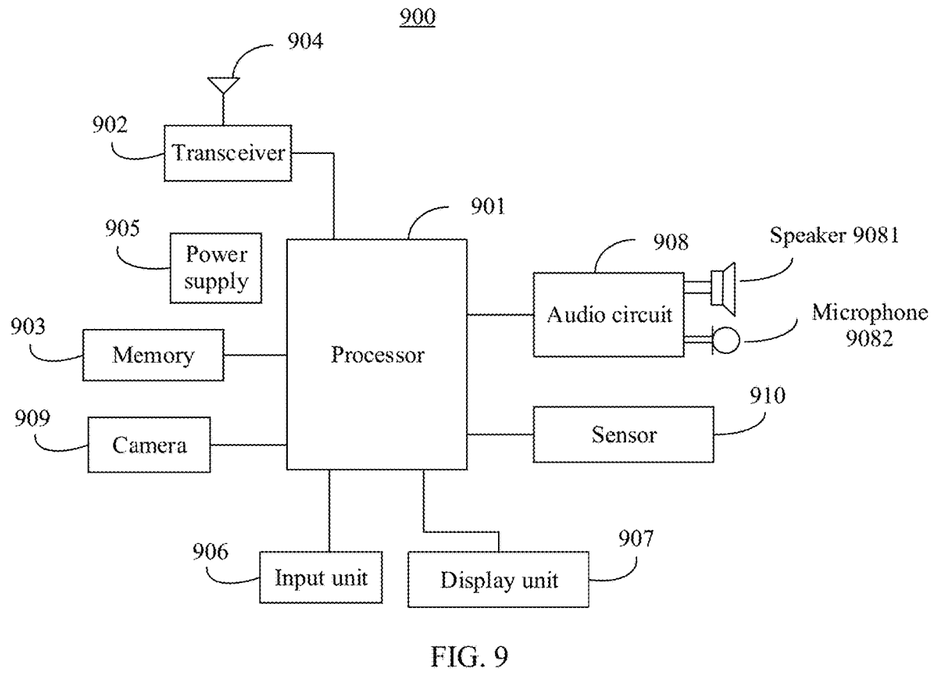
FIG. 9 is a schematic structural diagram of a sensor control entity according to an embodiment of this application.

FIG. 9 is a schematic structural diagram of a sensor control entity according to an embodiment of this application. As shown in FIG. 9, the sensor control entity 900 may be the sensor management entity or the scenario decision-making entity in the foregoing embodiment. The sensor control entity 900 includes a processor 901 and a transceiver 902.

Optionally, the sensor control entity 900 further includes a memory 903. The processor 901, the transceiver 902, and the memory 903 may communicate with each other through an internal connection path, to transfer a control signal and/or a data signal.

The memory 903 is configured to store a computer program. The processor 901 is configured to execute the computer program stored in the memory 903, to implement the functions in the foregoing apparatus embodiments.

Optionally, the memory 903 may be integrated into the processor 901, or may be independent of the processor 901.

Optionally, the sensor control entity 900 may further include an antenna 904, configured to transmit a signal output by the transceiver 902. Alternatively, the transceiver 902 receives a signal through the antenna.

Optionally, the sensor control entity 900 may further include a power supply 905, configured to supply power to various components or circuits in a vehicle-mounted device.

In addition, to improve a function of the vehicle-mounted device, the sensor control entity 900 may further include one or more of an input unit 906, a display unit 907 (which may also be considered as an output unit), an audio circuit 908, a camera 909, a sensor 910, and the like. The audio circuit may further include a speaker 9091, a microphone 9082, and the like. Details are not described herein.

This application further provides a computer-readable storage medium. The computer-readable storage medium stores a computer program. When the computer program is executed by a computer, the computer is enabled to perform the steps and/or the processing in any foregoing method embodiment.

This application further provides a computer program product. The computer program product includes computer program code. When the computer program code is run on a computer, the computer is enabled to perform the steps and/or the processing in any foregoing method embodiment.

This application further provides a chip, and the chip includes a processor. A memory configured to store a computer program is disposed independent of the chip. The processor is configured to execute the computer program stored in the memory, to perform the steps and/or the processing in any method embodiment.

Further, the chip may include the memory and a communications interface. The communications interface may be an input/output interface, a pin, an input/output circuit, or the like.

The processor mentioned in the foregoing embodiments may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field-programmable gate array (FPGA) or another programmable logic device, a discrete gate or transistor logic device, or a discrete hardware component. The general purpose processor may be a microprocessor, or the processor may be any conventional processor or the like. Steps of the methods disclosed in the embodiments of this application may be directly performed and completed by a hardware encoding processor, or may be performed and completed by a combination of hardware and software modules in the encoding processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in the foregoing embodiments may be a volatile memory or a non-volatile memory, or may include both a volatile memory and a non-volatile memory. The non-volatile memory may be a read-only memory (ROM), a programmable ROM (PROM), an erasable programmable ROM (EPROM), an electrically erasable programmable ROM (EEPROM), or a flash memory. The volatile memory may be a random-access memory (RAM), used as an external cache. Through example but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a SynchLink DRAM (SLDRAM), and a direct Rambus RAM (DR RAM). It should be noted that the memory of the systems and methods described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions may be implemented in the form of a software product. The software product is stored in a storage medium and includes several instructions for instructing a computer device (which is a personal computer, a server, or a network device) to perform all or some of the steps of the methods described in the embodiments of this application. The foregoing storage medium includes: any medium that can store program code, such as a universal serial bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A sensor control method, comprising:
receiving a configuration parameter that corresponds to a scenario and that configures a sensor to work in a short-range mode when the scenario is a first scenario and a long-distance mode when the scenario is a second scenario, wherein a first quantity of first surrounding pedestrians corresponding to the first scenario is greater than a first threshold, a first distance between the first surrounding pedestrians is less than or equal to a second threshold, or a first speed from first speed information of a vehicle corresponding to the first scenario is less than or equal to a third threshold, wherein a second quantity of second surrounding pedestrians corresponding to the second scenario is less than or equal to a fourth threshold, a second distance between the second surrounding pedestrians is greater than a fifth threshold, or a second speed from second speed information of the vehicle corresponding to the second scenario is greater than a sixth threshold, wherein the first threshold is greater than the fourth threshold, wherein the second threshold is less than the fifth threshold, and wherein the third threshold is less than the sixth threshold; and
configuring the sensor based on the configuration parameter.

2. The sensor control method of claim 1, wherein the configuration parameter further configures the sensor to work in a medium-range mode when the scenario is a third scenario, and wherein a third quantity of third surrounding pedestrians corresponding to the third scenario is less than or equal to the first threshold and greater than the fourth threshold, a third distance between the third surrounding pedestrians is greater than the second threshold and less than or equal to the fifth threshold, or a third speed from third speed information of the vehicle corresponding to the third scenario is greater than the third threshold and less than or equal to the sixth threshold.

3. The sensor control method of claim 2, wherein the first scenario is a downtown scenario, wherein the second scenario is a highway scenario, and wherein the third scenario is a suburban scenario.

4. The sensor control method of claim 1, further comprising reporting at least one of the first speed information, the second speed information, pedestrian detection information, or positioning information.

5. The sensor control method of claim 1, wherein the configuration parameter comprises a working mode, a measurement period, or a measurement time.

6. The sensor control method of claim 1, wherein the configuration parameter is based on a preset parameter correspondence comprising a correspondence between the scenario and the configuration parameter.

7. The sensor control method of claim 1, wherein the sensor is a radar or a lidar.

8. A sensor, comprising:
a receiver configured to receive a configuration parameter that corresponds to a scenario and that configures the sensor to work in a short-range mode when the scenario is a first scenario and a long-distance mode when the scenario is a second scenario, wherein a first quantity of first surrounding pedestrians corresponding to the first scenario is greater than a first threshold, a first distance between the first surrounding pedestrians is less than or equal to a second threshold, or a first speed from first speed information of a vehicle corresponding to the first scenario is less than or equal to a third threshold, wherein a second quantity of second surrounding pedestrians corresponding to the second scenario is less than or equal to a fourth threshold, a second distance between the second surrounding pedestrians is greater than a fifth threshold, or a second speed from second speed information of the vehicle corresponding to the second scenario is greater than a sixth threshold, wherein the first threshold is greater than the fourth threshold, wherein the second threshold is less than the fifth threshold, and wherein the third threshold is less than the sixth threshold; and
a processor coupled to the receiver and configured to configure the sensor based on the configuration parameter.

9. The sensor of claim 8, wherein the configuration parameter further configures the sensor to work in a medium-range mode when the scenario is a third scenario, and wherein a third quantity of third surrounding pedestrians corresponding to the third scenario is less than or equal to the first threshold and greater than the fourth threshold, a third distance between the third surrounding pedestrians is greater than the second threshold and less than or equal to the fifth threshold, or a third speed from third speed information of the vehicle corresponding to the third scenario is greater than the third threshold and less than or equal to the sixth threshold.

10. The sensor of claim 9, wherein the first scenario is a downtown scenario, wherein the second scenario is a highway scenario, and wherein the third scenario is a suburban scenario.

11. The sensor of claim 8, wherein the sensor further comprises a transmitter configured to report at least one of the first speed information, the second speed information, pedestrian detection information, or positioning information.

12. The sensor of claim 8, wherein the configuration parameter comprises a working mode, a measurement period, or a measurement time.

13. The sensor of claim 8, wherein the processor is further configured to determine the configuration parameter based on a preset parameter correspondence comprising a correspondence between the scenario and the configuration parameter.

14. The sensor of claim 8, wherein the sensor is a radar or a lidar.

15. A sensor control method, comprising:
obtaining a scenario and a configuration parameter, wherein the configuration parameter configures a sensor to work in a short-range mode when the scenario is a first scenario and a long-distance mode when the scenario is a second scenario, wherein a first quantity of first surrounding pedestrians corresponding to the first scenario is greater than a first threshold, a first distance between the first surrounding pedestrians is less than or equal to a second threshold, or a first speed from first speed information of a vehicle corresponding to the first scenario is less than or equal to a third threshold, wherein a second quantity of second surrounding pedestrians corresponding to the second scenario is less than or equal to a fourth threshold, a second distance between the second surrounding pedestrians is greater than a fifth threshold, or a second speed from second speed information of the vehicle corresponding to the second scenario is greater than a sixth threshold, wherein the first threshold is greater than the fourth threshold, wherein the second threshold is less than the fifth threshold, and wherein the third threshold is less than the sixth threshold; and
sending the configuration parameter.

16. The sensor control method of claim 15, wherein the configuration parameter further configures the sensor to work in a medium-range mode when the scenario is a third scenario, and wherein a third quantity of third surrounding pedestrians corresponding to the third scenario is less than or equal to the first threshold and greater than the fourth threshold, a third distance between the third surrounding pedestrians is greater than the second threshold and less than or equal to the fifth threshold, or a third speed from third speed information of the vehicle corresponding to the third scenario is greater than the third threshold and less than or equal to the sixth threshold.

17. The sensor control method of claim 16, wherein the first scenario is a downtown scenario, wherein the second scenario is a highway scenario, and wherein the third scenario is a suburban scenario.

18. The sensor control method of claim 15, further comprising receiving at least one of the first speed information, the second speed information, pedestrian detection information, or positioning information.

19. The sensor control method of claim 15, wherein the configuration parameter comprises a working mode, a measurement period, or a measurement time.

20. The sensor control method of claim 15, further comprising determining the configuration parameter based on a preset parameter correspondence comprising a correspondence between the scenario and the configuration parameter.

* * * * *